United States Patent [19]

Castner

[11] Patent Number: 5,451,646
[45] Date of Patent: Sep. 19, 1995

[54] TECHNIQUE FOR REDUCING THE MOLECULAR WEIGHT AND IMPROVING THE PROCESSABILITY OF CIS-1,4-POLYBUTADIENE

[75] Inventor: Kenneth F. Castner, Uniontown, Ohio

[73] Assignee: The Goodyear Tire & Rubber Company, Akron, Ohio

[21] Appl. No.: 349,276

[22] Filed: Dec. 5, 1994

[51] Int. Cl.$^6$ .................. C08F 4/70; C08F 136/06
[52] U.S. Cl. ..................... 526/137; 526/133; 526/141; 526/169.1; 526/340.4; 526/907; 524/722; 524/856
[58] Field of Search ............ 526/137, 141, 144, 169.1, 526/340.4, 907; 524/722, 856

[56] References Cited

U.S. PATENT DOCUMENTS

| | | | |
|---|---|---|---|
| 4,383,097 | 5/1983 | Castner et al. | 526/340.4 X |
| 5,100,982 | 3/1992 | Castner | 526/340.4 X |

FOREIGN PATENT DOCUMENTS

| | | | |
|---|---|---|---|
| 1589920 | 5/1970 | France | 526/141 |
| 1065656 | 4/1967 | United Kingdom | 526/141 |

*Primary Examiner*—Fred Teskin
*Attorney, Agent, or Firm*—Alvin T. Rockhill

[57] ABSTRACT

Cis-1,4-polybutadiene can be synthesized by polymerizing 1,3-butadiene monomer with a three component nickel catalyst system containing (a) an organonickel compound, (b) an organoaluminum compound, and (c) a fluorine containing compound. However, the molecular weight of the cis-1,4-polybutadiene prepared is typically too high to be utilized as a non-oil extended rubber. This invention is based upon the discovery that para-styrenated diphenylamine acts to reduce the molecular weight and to improve the processability of cis-1,4-polybutadiene prepared with such nickel based catalyst systems. The use of para-styrenated diphenylamine as a modifier in such polymerizations does not change the microstructure of the cis-1,4-polybutadiene produced. Accordingly, the present invention specifically discloses a process for producing cis-1,4-polybutadiene having a reduced molecular weight and improved processability which comprises polymerizing 1,3-butadiene in the presence of (a) an organonickel compound, (b) an organoaluminum compound, (c) a fluorine containing compound, and (d) para-styrenated diphenylamine; wherein the organoaluminum compound and the fluorine containing compound are brought together in the presence of the para-styrenated diphenylamine. Since para-styrenated diphenylamine is an excellent antidegradant, it also provides the rubber synthesized in its presence with antioxidant protection.

20 Claims, No Drawings

TECHNIQUE FOR REDUCING THE MOLECULAR WEIGHT AND IMPROVING THE PROCESSABILITY OF CIS-1,4-POLYBUTADIENE

BACKGROUND OF THE INVENTION

It is well known that cis-1,4-polybutadiene can be prepared by polymerizing 1,3-butadiene monomer with nickel based catalyst systems. Such nickel based catalyst systems contain (a) an organonickel compound, (b) an organoaluminum compound, and (c) a fluorine containing compound. Such nickel based catalyst systems and their use in the synthesis of cis-1,4-polybutadiene is described in detail in U.S. Pat. No. 3,856,764, 3,910,869, and 3,962,375.

The cis-1,4-polybutadiene prepared utilizing such nickel based catalyst systems typically has a high molecular weight. Due to this high molecular weight, the cis-1,4-polybutadiene is generally oil extended. However, this precludes the cis-1,4-polybutadiene from being utilized in many applications. For instance, such oil extended rubbers cannot be utilized in tire sidewalls which contain white sidewall compounds. In any case, there is a large demand for cis-1,4-polybutadiene having a reduced molecular weight which can be processed without being oil extended.

Various compounds have been found to act as molecular weight reducing agents when used in conjunction with the nickel based catalyst system. For instance, U.S. Pat. No. 4,383,097 discloses that alpha-olefins, such as ethylene and propylene, act as molecular weight reducing agents when utilized in conjunction with such three component nickel catalyst systems. Canadian Patent 1,236,648 indicates that 1-butene, isobutylene, cis-2-butene, trans-2-butene, and allene act as molecular weight regulators when used in conjunction with such nickel based catalyst systems. U.S. Pat. No. 4,383,097 reveals that certain nonconjugated diolefins, such as 1,4-pentadiene, 1,6-heptadiene, and 1,5-hexadiene, act as molecular weight reducing agents when utilized in conjunction with such catalyst systems. U.S. Pat. No. 5,100,982 indicates that cis-1,4-polybutadiene having reduced molecular weight and a broad molecular weight distribution can be synthesized with certain nickel based catalyst systems in the presence of halogenated phenols, such as para-chlorophenol.

The processability of cis-1,4-polybutadiene rubbers can be improved by simply lowering their molecular weight. However, this approach also typically leads to increased cold flow. Accordingly, the use of conventional molecular weight reducing agents, such as α-olefins, to improve rubber processability leads to compromised cold flow characteristics.

SUMMARY OF THE INVENTION

It has been unexpectedly found that para-styrenated diphenylamine acts as molecular weight reducing agent when employed in conjunction with nickel based catalyst systems which contain (a) an organonickel compound, (b) an organoaluminum compound, and (c) a fluorine containing compound. It has further been discovered that para-styrenated diphenylamine also acts to improve the processability of cis-1,4-polybutadiene rubbers prepared in their presence utilizing such nickel based catalyst systems. Para-styrenated diphenylamine can be employed in conjunction with such nickel based catalyst systems to reduce the molecular weight of the rubber without sacrificing cold flow characteristics.

The para-styrenated diphenylamine which remains in the rubber produced also acts in a manner which provides it with antioxidant protection. In other words, the para-styrenated diphenylamine accomplishes two major objectives. It acts as a molecular weight regulator and acts as an antidegradant.

The subject invention more specifically discloses a process for producing cis-1,4-polybutadiene having a reduced molecular weight and improved processability which comprises polymerizing 1,3-butadiene in the presence of (a) an organonickel compound, (b) an organoaluminum compound, (c) a fluorine containing compound, and (d) para-styrenated diphenylamine; wherein the organoaluminum compound and the fluorine containing compound are brought together in the presence of the para-styrenated diphenylamine.

DETAILED DESCRIPTION OF THE INVENTION

The polymerizations of this invention will typically be carried out as solution polymerizations in a hydrocarbon solvent which can be one or more aromatic, paraffinic, or cycloparaffinic compounds. These solvents will normally contain from 4 to about 10 carbon atoms per molecule and will be liquids under the conditions of the polymerization. Some representative examples of suitable organic solvents include isooctane, cyclohexane, normal hexane, benzene, toluene, xylene, ethylbenzene, and the like, alone or in admixture.

Para-styrenated diphenylamine will also act as molecular weight reducing agent in bulk polymerizations which are carried out with nickel based catalyst systems containing (a) an organonickel compound, (b) an organoaluminum compound, and (c) a fluorine containing compound. Such bulk polymerizations are described in detail in British Patent 2,186,880. The teachings of British Patent 2,186,880 are incorporated herein by reference in their entirety.

In the solution polymerizations of this invention, there will normally be from about 5 to about 35 weight percent monomers in the polymerization medium. Such polymerization media are, of course, comprised of the organic solvent and the 1,3-butadiene monomer. As the polymerization proceeds, monomer is converted to polymer and accordingly the polymerization medium will contain from about 5 to about 35 weight percent unreacted monomers and polymer. In most cases, it will be preferred for the polymerization medium to contain from about 10 to about 30 weight percent monomers and polymers. It is generally more preferred for the polymerization medium to contain from 20 to 25 weight percent monomers and polymers.

Polymerization is typically started by adding the nickel based catalyst system and the para-styrenated diphenylamine to the polymerization medium. However, it is critical for the organoaluminum compound and the fluorine containing compound to be brought together in the presence of the para-styrenated diphenylamine. The organonickel compound can be brought into contact with the para-styrenated diphenylamine either before or after it is brought into contact with the fluorine containing compound.

In batch techniques, it is normally convenient to add the catalyst components and the para-styrenated diphenylamine to a polymerization medium which already contains 1,3-butadiene monomer in an organic solvent. This is preferably done by sequentially adding (1) the organoaluminum compound, (2) the para-styrenated diphenylamine, (3) the organonickel compound and (4) the fluorine containing compound to the polymerization medium. Another preferred batch technique involves the sequential addition of (1) the organoaluminum compound, (2) the organonickel compound, (3) the para-styrenated diphenylamine and (4) the fluorine containing compound to the polymerization medium. Also, the p-styrenated diphenylamine can be prereacted with the fluorine containing compound with the resultant product being added to the polymerization medium.

The organoaluminum compound that can be utilized has the structural formula:

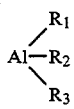

in which $R_1$ is selected from the group consisting of alkyl groups (including cycloalkyl), aryl groups, alkaryl groups, arylalkyl groups, alkoxy groups, hydrogen and fluorine; $R_2$ and $R_3$ being selected from the group consisting of alkyl groups (including cycloalkyl), aryl groups, alkaryl groups, and arylalkyl groups. It is preferred for $R_1$, $R_2$ and $R_3$ to represent alkyl groups which contain from 1 to about 10 carbon atoms. It is more preferred for $R_1$, $R_2$ and $R_3$ to represent alkyl groups which contain from two to five carbon atoms.

Some representative examples of organoaluminum compounds that can be utilized are diethyl aluminum hydride, di-n-propyl aluminum hydride, di-n-butyl aluminum hydride, diisobutyl aluminum hydride, diphenyl aluminum hydride, di-p-tolyl aluminum hydride, dibenzyl aluminum hydride, phenyl ethyl aluminum hydride, phenyl-n-propyl aluminum hydride, p-tolyl ethyl aluminum hydride, p-tolyl n-propyl aluminum hydride, p-tolyl isopropyl aluminum hydride, benzyl ethyl aluminum hydride, benzyl n-propyl aluminum hydride, and benzyl isopropyl aluminum hydride, diethylaluminum ethoxide, diisobutylaluminum ethoxide, dipropylaluminum methoxide, trimethyl aluminum, triethyl aluminum, tri-n-propyl aluminum, triisopropyl aluminum, tri-n-butyl aluminum, triisobutyl aluminum, tripentyl aluminum, trihexyl aluminum, tricyclohexyl aluminum, trioctyl aluminum, triphenyl aluminum, tri-p-tolyl aluminum, tribenzyl aluminum, ethyl diphenyl aluminum, ethyl di-p-tolyl aluminum, ethyl dibenzyl aluminum, diethyl phenyl aluminum, diethyl p-tolyl aluminum, diethyl benzyl aluminum and other triorganoaluminum compounds. The preferred organoaluminum compounds include triethyl aluminum (TEAL), tri-n-propyl aluminum, triisobutyl aluminum (TIBAL), trihexyl aluminum, diisobutyl aluminum hydride (DIBA-H), and diethyl aluminum fluoride.

The component of the catalyst which contains nickel can be any soluble organonickel compound. These soluble nickel compounds are normally compounds of nickel with a mono-dentate or bi-dentate organic ligands containing up to 20 carbon atoms. A ligand is an ion or molecule bound to and considered bonded to a metal atom or ion. Mono-dentate means having one position through which covalent or coordinate bonds with the metal may be formed. Bi-dentate means having two positions through which covalent or coordinate bonds with the metal may be formed. The term "soluble" refers to solubility in butadiene monomer and inert solvents.

Generally, any nickel salt or nickel containing organic acid containing from about 1 to 20 carbon atoms may be employed as the soluble nickel containing compound. Some representative examples of soluble nickel containing compounds include nickel benzoate, nickel acetate, nickel naphthenate, nickel octanoate, nickel neodecanoate, bis(α-furyl dioxime) nickel, nickel palmitate, nickel stearate, nickel acetylacetonate, nickel salicaldehyde, bis(cyclopentadiene) nickel, bis(salicylaldehyde) ethylene diimine nickel, cyclopentadienyl-nickel nitrosyl, bis($\pi$-allyl nickel), bis($\pi$ cycloocta-1,5-diene), bis($\pi$-allyl nickel trifluoroacetate), and nickel tetracarbonyl. The preferred component containing nickel is a nickel salt of a carboxylic acid or an organic complex compound of nickel. Nickel naphthenate, nickel octanoate, and nickel neodecanoate are highly preferred soluble nickel containing compounds. Nickel 2-ethylhexanoate, which is commonly referred to as nickel octanoate (NiOct) is the soluble nickel containing compound which is most commonly used due to economic factors.

The fluorine containing compound utilized in the catalyst system is generally hydrogen fluoride or boron trifluoride. If hydrogen fluoride is utilized, it can be in the gaseous or liquid state. It, of course, should be anhydrous and as pure as possible. The hydrogen fluoride can be dissolved in an inert solvent; and thus, can be handled and charged into the reaction zone as a liquid solution. Optionally, butadiene monomer can be utilized as the solvent. Inert solvents include alkyl-, alkaryl-, arylalkyl-, and aryl-hydrocarbons. For example, benzene and toluene are convenient solvents.

The boron trifluoride component of the catalyst can be gaseous boron trifluoride. It should also be anhydrous and as pure as possible.

The hydrogen fluoride and/or boron trifluoride can also be utilized as complexes in the catalyst system as the fluorine containing compound. Hydrogen fluoride complexes and boron trifluoride complexes can readily be made with compounds which contain an atom or radical which is capable of lending electrons to or sharing electrons with hydrogen fluoride or boron trifluoride. Compounds capable of such associating are ethers, alcohols, ketones, esters, nitriles, amines, and water.

The ketone subclass can be defined by the formula

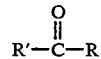

wherein R' and R are selected from the group consisting of alkyl radicals, cycloalkyl radicals, aryl radicals, alkaryl radicals, and arylalkyl radicals containing from 1 to about 30 carbon atoms; and wherein R' and R can be the same or different. These ketones represent a class of compounds which have a carbon atom attached by a double bond to oxygen. Some representative examples of ketones that are useful in the preparation of the ketone-hydrogen fluoride complexes or boron trifluoride complexes of this invention include dimethyl ketone, methylethyl ketone, dibutyl ketone, methyl isobutyl ketone, ethyl octyl ketone, 2,4-pentanedione, butyl cycloheptanone, acetophenone, amylphenyl ketone, butylphenyl ketone, benzophenone, phenyltolyl ketone, quinone and the like. The preferred ketones that can be used to form the ketone-hydrogen fluoride compounds and the ketone-boron trifluoride compounds of this invention are the dialkyl ketones of which acetone is most preferred.

The nitrile subclass can be represented by the formula RCN where R represents alkyl groups, cycloalkyl groups, aryl groups, alkaryl groups or arylalkyl groups that contain up to about 30 carbon atoms. The nitriles contain a carbon atom attached to a nitrogen atom by a triple bond. Representative but not exhaustive of the nitrile subclass are acetonitrile, butyronitrile, acrylonitrile, benzonitrile, tolunitrile, phenylacetonitrile, and the like. The preferred hydrogen fluoride-nitrile complex or boron trifluoride nitrile complex is the hydrogen fluoride benzonitrile complex or the boron trifluoride benzonitrile complex.

The alcohol subclass can be defined by the formula ROH where R represents alkyl radicals, cycloalkyl radicals, aryl radicals, alkaryl radicals, or arylalkyl radicals containing from about 1 to about 30 carbon atoms. These alcohols represent a class of compounds which have a carbon atom attached by a single bond to oxygen which is in turn attached to a hydrogen by a single bond. Representative but not exhaustive of the alcohols useful in the preparation of hydrogen fluoride complexes and boron trifluoride complexes are methanol, ethanol, n-propanol, isopropanol, phenol, benzyl alcohol, cyclohexanol, butanol, hexanol and pentanol. The preferred hydrogen fluoride-alcohol complex or boron trifluoride alcohol complex is hydrogen fluoride phenolate complex or boron trifluoride phenolate complex.

The ether subclass can be defined by the formula R'OR where R and R' represent alkyl radicals, cycloalkyl radicals, aryl radicals, alkaryl radicals, and arylalkyl radicals containing from about 1 to about 30 carbon atoms; wherein R and R' may be the same or dissimilar. The R may also be joined through a common carbon bond to form a cyclic ether with the ether oxygen being an integral part of the cyclic structure such as tetrahydrofuran, furan or dioxane. These ethers represent a class of compounds which have two carbon atoms attached by single bonds to an oxygen atom. Representative but not exhaustive of the ethers useful in the preparation of the hydrogen fluoride complexes or boron trifluoride complexes of this invention are dimethyl ether, diethyl ether, dibutyl ether, diamyl ether, diisopropyl ethers, tetrahydrofuran, anisole, diphenyl ether, ethyl methyl ether, dibenzyl ether and the like. The preferred hydrogen fluoride-ether complexes or boron trifluoride-ether complexes are hydrogen fluoride diethyl etherate, hydrogen fluoride dibutyl etherate, boron trifluoride diethyl etherate, boron trifluoride dibutyl etherate complexes.

The ester subclass can be defined by the formula

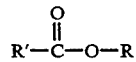

wherein R and R' are selected from the group consisting of alkyl radicals, cycloalkyl radicals, aryl radicals, alkaryl radicals and arylalkyl radicals containing from 1 to about 20 carbon atoms. The esters contain a carbon atom attached by a double bond to an oxygen atom as indicated. Representative but not exhaustive of such esters are ethyl benzoate, amyl benzoate, phenyl acetate, phenyl benzoate and other esters conforming to the formula above. The preferred hydrogen fluoride-ester complex is hydrogen fluoride ethyl benzoate complex. The preferred boron trifluoride-ester complex is boron trifluoride ethyl benzoate complex.

The hydrogen fluoride can also be utilized as a complex with the p-styrenated diphenylamine. In this case, the para-styrenated diphenylamine and hydrogen fluoride form a salt which is soluble in aromatic solvents, such as toluene. When added to the polymerization system, the salt reacts with the organoaluminum compound to form alkylaluminum fluorides and free p-styrenated diphenylamine.

Such complexes are usually prepared by simply bubbling gaseous boron trifluoride or hydrogen fluoride into appropriate amounts of the complexing agent, for instance, a ketone, an ether, an ester, an alcohol, or a nitrile. This should be done in the absence of moisture, and measures should be taken to keep the temperature from rising above about 100° F. (37.7° C.). In most cases, boron trifluoride and hydrogen fluoride complexes are prepared with the temperature being maintained at room temperature. Another possible method would be to dissolve the hydrogen fluoride or the complexing agent in a suitable solvent followed by adding the other component. Still another method of mixing would be to dissolve the complexing agent in a solvent and simply bubble gaseous hydrogen fluoride or boron trifluoride through the system until all of the complexing agent is reacted with the hydrogen fluoride or boron trifluoride. The concentrations can be determined by weight gain or chemical titration.

The three component catalyst system utilized can be preformed. If the catalyst system is preformed, it will maintain a high level of activity over a long period of time. The utilization of such a preformed catalyst system also results in the formation of a uniform polymeric product. Such preformed catalyst systems are prepared in the presence of one or more preforming agents selected from the group consisting of monoolefins, nonconjugated diolefins, conjugated diolefins, cyclic nonconjugated multiolefins, acetylenic hydrocarbons, triolefins, vinyl ethers and aromatic nitriles.

Some representative examples of olefins that can be used as the preforming agent in the preparation of stabilized catalysts are trans-2-butene, mixed cis and trans-2-pentene, and cis-2-pentene. Some nonconjugated diolefins that can be used as preforming agents are cis-1,4-hexadiene, 1,5-heptadiene, 1,7-octadiene, and the like. Representative examples of cyclic nonconjugated multiolefins that can be used include 1,5-cyclooctadiene, 1,5,9-cyclododecatriene, and 4-vinyl cyclohexene-1. Some representative examples of acetylenic hydrocarbons which can be used as the preforming agent are methyl acetylene, ethyl acetylene, 2-butyne, 1-pentyne, 2-pentyne, 1-octyne, and phenyl acetylene. Triolefins that can be used as the preforming agent include 1,3,5-hexatriene, 1,3,5-heptatriene, 1,3,6-octatriene, 5-methyl-1,3,6-heptatriene and the like. Some representative examples of substituted conjugated diolefins that can be used include 1,4-diphenyl butadiene, myrcene (7-methyl-3-methylene-1,6octadiene), and the like. Ethyl vinyl ether and isobutyl vinyl ether are representative examples of alkyl vinyl ethers that can be used as the preforming agent. A representative example of an aromatic nitrile that can be used is benzonitrile. Some representative examples of conjugated diolefins that can be used include 1,3-butadiene, isoprene, and 1,3-pentadiene. The preferred preforming agent is 1,3-butadiene.

A method of preparing the preformed catalyst so that it will be highly active and relatively chemically stable is to add the organoaluminum compound and the preforming agent to the solvent medium before they come into contact with the nickel compound and the para-styrenated diphenylamine. The nickel compound and the para-styrenated diphenylamine are then added to the solution with the fluoride compound being added to the solution subsequently. As an alternative, the preforming agent and the nickel compound may be mixed, followed by the addition of the organoaluminum compound, the para-styrenated diphenylamine and then the fluoride compound or the hydrogen fluoride/p-styrenated diphenylamine complex. Other orders of addition may be used but they generally produce less satisfactory results.

The amount of preforming agent used to preform the catalyst may be within the range of about 0.001 to 3 percent of the total amount of monomer to be polymerized. Expressed as a mole ratio of preforming agent to nickel compound, the amount of preforming agent present during the preforming step can be within the range of about 1 to 3000 times the concentration of nickel. The preferred mole ratio of preforming agent to nickel is about 3:1 to 500:1.

These preformed catalysts have catalytic activity immediately after being prepared. However, it has been observed that a short aging period, for example 15 to 30 minutes, at a moderate temperature, for example 50° C., increases the activity of the preformed catalyst greatly.

In order to properly stabilize the catalyst, the preforming agent must be present before the organoaluminum compound has an opportunity to react with either the nickel compound or the fluoride compound. If the catalyst system is preformed without the presence of at least a small amount of preforming agent, the chemical effect of the organoaluminum upon the nickel compound or the fluoride compound is such that the catalytic activity of the catalyst is greatly lessened and shortly thereafter rendered inactive. In the presence of at least a small amount of preforming agent, the catalytic or shelf life of the catalyst is greatly improved over the system without any preforming agent present.

The three component nickel catalyst system can also be premixed. Such premixed catalyst systems are prepared in the presence of one or more polymeric catalyst stabilizers. The polymeric catalyst stabilizer can be in the form of a liquid polymer, a polymer cement, or a polymer solution. Polymeric catalyst stabilizers are generally homopolymers of conjugated dienes or copolymers of conjugated dienes with styrenes and methyl substituted styrenes. The diene monomers used in the preparation of polymeric catalyst stabilizers normally contain from 4 to about 12 carbon atoms. Some representative examples of conjugated diene monomers that can be utilized in making such polymeric catalyst stabilizers include isoprene, 1,3-butadiene, piperylene, 1,3-hexadiene, 1,3-heptadiene, 1,3-octadiene, 2,4-hexadiene, 2,4-heptadiene, 2,4-octadiene and 1,3-nonadiene. Also included are 2,3-dimethylbutadiene, 2,3-dimethyl-1,3-hexadiene, 2,3-dimethyl-1,3-heptadiene, 2,3-dimethyl-1,3-octadiene and 2,3-dimethyl-1,3-nonadiene and mixtures thereof.

Some representative examples of polymeric catalyst stabilizers include polyisoprene, polybutadiene, polypiperylene, copolymers of butadiene and styrene, copolymers of butadiene and α-methylstyrene, copolymers of isoprene and styrene, copolymers of isoprene and α-methylstyrene, copolymers of piperylene and styrene, copolymers of piperylene and α-methylstyrene, copolymers of 2,3-dimethyl-1,3-butadiene and styrene, copolymers of 2,3-dimethyl butadiene and α-methylstyrene, copolymers of butadiene and vinyltoluene, copolymers of 2,3-dimethyl-1,3-butadiene and vinyltoluene, copolymers of butadiene and β-methylstyrene, and copolymers of piperylene and β-methylstyrene.

In order to properly stabilize the catalyst system by this premixing technique, the polymeric catalyst stabilizer must be present before the organoaluminum compound has an opportunity to react with either the nickel compound or the fluorine containing compound. The para-styrenated diphenylamine will, of course, be present when the organoaluminum compound is brought into contact with the fluorine containing compound. If the catalyst system is premixed without the presence of at least a small amount of polymeric catalyst stabilizer, the chemical effect of the organoaluminum compound upon the nickel compound or the fluoride compound is such that the catalytic activity of the catalyst system is greatly lessened and shortly thereafter rendered inactive. In the presence of at least a small amount of polymeric catalyst stabilizer, the catalytic or shelf life of the catalyst system is greatly improved over the same system without any polymeric catalyst stabilizer present.

One method of preparing this premixed catalyst system so that it will be highly active and relatively chemically stable is to add the organoaluminum compound to the polymer cement solution and mix thoroughly before the organoaluminum compound comes into contact with the nickel containing compound. The nickel compound is then added to the polymer cement solution. Alternatively, the nickel compound can be mixed with the polymer cement first, followed by the addition of the organoaluminum compound and the para-styrenated diphenylamine. Then the fluorine containing compound is added to the polymer cement solution. This is not intended to preclude other orders or methods of catalyst addition, but it is emphasized that the polymer stabilizer must be present before the organoaluminum compound has a chance to react with either the nickel containing compound or the fluorine containing compound.

The amount of polymeric catalyst stabilizer used to premix the catalyst system can be within the range of about 0.01 to 3 weight percent of the total amount monomer to be polymerized. Expressed as a weight ratio of polymeric catalyst stabilizer to nickel, the amount of polymeric catalyst stabilizer present during the premixing step can be within the range of about 2 to 2000 times the concentration of nickel. The preferred weight ratio of polymeric catalyst stabilizer to nickel is from about 4:1 to about 300:1. Even though such premixed catalyst systems show catalytic activity immediately after being prepared, it has been observed that a short aging period, for example 15 to 30 minutes, at moderate temperatures, for example 50° C., increases the activity of the preformed catalyst system.

A "modified in situ" technique can also be used in making the three component nickel catalyst system. In fact, the utilization of catalysts made by such "modified in situ" techniques results in more uniform control of the polymerization and the polymeric product. In such a "modified in situ" technique, the organoaluminum compound is added to neat 1,3-butadiene monomer with the nickel containing compound and the para-styrenated diphenylamine being added later. The butadiene monomer containing the organoaluminum compound, the para-styrenated diphenylamine and the nickel containing compound is then charged into the reaction zone being used for the polymerization with the fluorine containing compound being charged into the reaction zone separately. Normally, the organoaluminum compound, the para-styrenated diphenylamine and the nickel containing compound are charged into the reaction zone soon after being mixed into the butadiene monomer. In most cases, the organoaluminum compound, the para-styrenated diphenylamine and the nickel containing compound are charged into the reaction zone within 60 seconds after being mixed in the butadiene monomer. It will generally be desirable to utilize organoaluminum compounds and nickel containing compounds which have been dissolved in a suitable solvent.

The three component nickel catalyst systems utilized in the practice of the present invention have activity over a wide range of catalyst concentrations and catalyst component ratios. The three catalyst components interact to form the active catalyst system. As a result, the optimum concentration for any one component is very dependent upon the concentrations of each of the other two catalyst components. Furthermore, while polymerization will occur over a wide range of catalyst concentrations and ratios, the most desirable properties for the polymer being synthesized are obtained over a relatively narrow range. Polymerizations can be carried out utilizing a mole ratio of the organoaluminum compound to the nickel containing compound within the range of from about 0.3:1 to about 300:1; with the mole ratio of the fluorine containing compound to the organonickel containing compound ranging from about 0.5:1 to about 200:1 and with the mole ratio of the fluorine containing compound to the organoaluminum compound ranges from about 0.4:1 to about 10:1. The preferred mole ratios of the organoaluminum compound to the nickel containing compound ranges from about 1 to about 100:1, and the preferred mole ratio of the fluorine containing compound to the organoaluminum compound ranges from about 0.7:1 to about 7:1. The concentration of the catalyst system utilized in the reaction zone depends upon factors such as purity, the reaction rate desired, the polymerization temperature utilized, the reactor design and other factors.

In order to facilitate charging the catalyst components into the reaction zone "in situ" they can be dissolved in a small amount of an inert organic solvent or butadiene monomer. Preformed and premixed catalyst systems will, of course, already be dissolved in a solvent.

The amount of para-styrenated diphenylamine that needs to be employed as a molecular weight reducing agent varies with the catalyst system, with the polymerization temperature, and with the desired molecular weight of the high cis-1,4-polybutadiene rubber being synthesized. For instance, if a high molecular weight rubber is desired, then a relatively small amount of para-styrenated diphenylamine is required. On the other hand, in order to reduce molecular weights substantially, a relatively large amount of the para-substituted diphenylamine will need to be employed. Generally, greater amounts of the para-styrenated diphenylamine are required when the catalyst system being utilized contains hydrogen fluoride or is an aged catalyst which contains boron trifluoride. However, as a general rule, from about 0.25 phm (parts by weight per hundred parts of monomer) to about 1.5 phm of the para-styrenated diphenylamine will be employed.

It is normally preferred to utilize 0.5 phm to 0.75 phm of the para-styrenated diphenylamine because at such concentrations good reductions in molecular weight can be realized and the high cis-1,4-polybutadiene rubber produced is provided with a good level of stabilization. In such cases, the molecular weight of the rubber being synthesized can be controlled by adjusting the ratio of the fluorine containing compound to the organoaluminum compound. In other words, at constant levels of the para-styrenated diphenylamine within the range of 0.25 phm to 1.5 phm, the molecular weight of the polymer being synthesized can be controlled by varying the ratio of the fluorine containing compound to the organoaluminum compound. Maximum reductions in molecular weight and maximum conversions normally occur at molar ratios of the fluorine containing compound to the organoaluminum compound which are within the range of 1.5:1 to 2:1. At molar ratios of less than 1.5:1 and at molar ratios within the range of 2:1 to 2.75:1, lesser reductions in molecular weight occur.

The temperatures utilized in the polymerizations of this invention are not critical and may vary from extremely low temperatures to very high temperatures. For instance, such polymerizations can be conducted at any temperature within the range of about −10° C. to about 120° C. The polymerizations of this invention will preferably be conducted at a temperature within the range of about 30° C. to about 110° C. It is normally preferred for the polymerization to be carried out at a temperature which is within the range of about 70° C. to about 95° C. Such polymerizations will normally be conducted for a period of time which is sufficient to attain a high yield which is normally in excess of about 80% and preferably in excess of about 90%.

The cis-1,4-polybutadiene rubber made utilizing the techniques of this invention typically has a cis content in excess of about 95%. For example, the cis-1,4-polybutadiene rubber made utilizing the techniques of this invention will typically have a cis content of about 97%, a trans content of about 2%, and a vinyl content of about 1%.

After the polymerization is completed, the cis-1,4-polybutadiene rubber may be recovered from the resulting polymer solution (rubber cement) by any of several procedures. One such procedure comprises mixing the rubber cement with a polar coagulating agent, such as methanol, ethanol, isopropylalcohol, acetone, or the like. The coagulating agent can be added at room temperature or below whereupon the liquified low molecular weight hydrocarbons will vaporize. If desired, gentle heat may be applied to hasten the removal of low molecular weight hydrocarbons, but not sufficient heat to vaporize the polar coagulating agent. The vaporized low molecular weight hydrocarbon solvents can then be recovered and recycled. The coagulated rubber is recovered from the slurry of the polar coagulating agent by centrifugation, decantation or filtration.

Another procedure for recovering the cis-1,4-polybutadiene rubber is by subjecting the rubber solution to spray drying. Such a procedure is particularly suitable for continuous operations and has the advantage that heat requirements are at a minimum. When such a procedure is used, the recovered polymer should be washed soon after recovery with a polar solvent in order to destroy the remaining active catalyst contained in the polymer. In such procedures the vaporized organic solvents are also easily recovered, but will normally require purification before being recycled.

The practice of this invention is further illustrated by the following examples which are intended to be representative rather than restrictive of the scope of the subject invention. Unless indicated otherwise, all parts and percentages are given by weight. Dilute solutions viscosities were determined in toluene at 30° C.

EXAMPLES 1-11

In this series of experiments, Wingstay® 29 para-styrenated diphenylamine was evaluated as a molecular weight reducing agent in Examples 2-6. Example 1 was conducted as a control with no molecular weight regulator being utilized. Examples 7-11 were conducted as comparative examples where 1,5-hexadiene was employed as a molecular weight reducing agent. Wingstay® 29 para-styrenated diphenylamine is sold commercially by The Goodyear Tire & Rubber Company and typically consists of several isomers including:

p,p'-distyryl diphenylamine
o,p,p'-tristyryl diphenylamine
o,p'-distyryl diphenylamine
p-styryl diphenylamine
o,o'-distyryl diphenylamine Para-styrenated diphenylamine, which is also known as p,p'-distyryl diphenylamine, is an amber viscous liquid having a specific gravity of 1.08 which has the chemical structural formula:

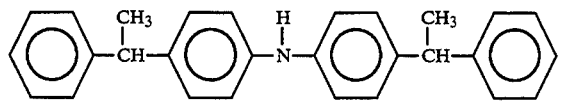

Para-styrenated diphenylamine is also sold by Lowi under the tradename Lowinox SDA and by Mobay under the tradename Vulkanox DDA.

In this series of experiments 750 mls of a 15.5% solution of 1,3-butadiene monomer in hexane was added to a series of quart (946 ml) polymerization bottles under a nitrogen atmosphere. The bottles were capped using a self-sealing gasket with a Teflon liner. The molecular weight regulator (para-styrenated diphenylamine in Examples 2-6) was added with a hypodermic syringe followed by the addition of 1.50 mM of triisobutylaluminum and subsequently 0.038 mM of nickel octanoate. The molar ratio of the triisobutylaluminum to nickel octanoate was 40:1. The para-styrenated diphenylamine or 1,5-hexadiene was added in the amount shown in Table I. A hydrofluoric acid solution was then added. A sufficient amount of hydrofluoric acid was added to attain a molar ratio of hydrofluoric acid to nickel octanoate of 70:1.

The polymerization bottles were then placed in a constant temperature bath which was maintained at a temperature of 65° C. After a polymerization time of about 90 minutes, isopropyl alcohol was added as a short stop. The polymer cement made was then hot air oven dried overnight.

The rubber samples which were recovered were evaluated to determine the Mooney (ML1+4 (100° C.)) viscosities, Brookfield viscosities and cold flows of the high cis-1,4-polybutadiene samples made. These results are reported in Table I. The yields attained in this series of polymerizations are also reported in Table I.

TABLE I

| Ex No | Modifier | Modifier Conc (Molarity) | Yield (%) | ML1 + 4 (100°) | Cold Flow (mg/min) | BF (cps) |
|---|---|---|---|---|---|---|
| 1 | None | 0 | 91 | 96 | 0 | 35,500 |
| 2 | W-29 | 0.0006 | 96 | 57 | 0.60 | 7,540 |
| 3 | W-29 | 0.0012 | 97 | 43 | 1.03 | 3,500 |
| 4 | W-29 | 0.0018 | 92 | 35 | 1.15 | 2,000 |
| 5 | W-29 | 0.0024 | 93 | 34 | 0.90 | 1,910 |
| 6 | W-29 | 0.0030 | 92 | 33 | 1.13 | 2,000 |
| 7 | 1,5HxD | 0.0004 | 89 | 72 | 0.62 | 17,600 |
| 8 | 1,5HxD | 0.0009 | 89 | 57 | 1.04 | 8,900 |
| 9 | 1,5HxD | 0.0013 | 93 | 50 | 1.92 | 6,100 |
| 10 | 1,5HxD | 0.0018 | 91 | 43 | 2.98 | 4,100 |
| 11 | 1,5HxD | 0.0022 | 92 | 39 | 4.14 | 3,600 |

W-29 = Wingstay 29 = p-oriented styrenated diphenylamine
1,5-HxD = 1,5-hexadiene
DSV run at 30° C. using 0.25% polymer in toluene
BF = Brookfield viscosity, run at ca. 25° C. using 10 wt % polymer in toluene Inspection of the results presented in Table I show Wingstay® 29 para-styrenated diphenylamine to be an extremely efficient molecular weight regulator. The Mooney (ML1+4 (100° C.)) viscosities and Brookfield viscosities of the cis-1,4-polybutadiene produced dropped sharply with increasing levels of para-styrenated diphenylamine. However, the para-styrenated diphenylamine did not adversely affect polymer yields. In fact, the yields attained in Examples 2-6 were at least 92% which is better that the yield realized in the control (Example 1).

This series of experiments also shows that the para-styrenated diphenylamine did not increase the cold flow of the high cis-1,4-polybutadiene rubber produced greatly. By comparing Examples 2-6 with Examples 7-11 it can be seen that the para-styrenated diphenylamine did not increase cold flows as much as 1,5-hexadiene. In fact, the cold flow of the rubber synthesized was less than 1.2 mg/min even when the para-styrenated diphenylamine was used at the highest level in Example 6.

EXAMPLES 12-16

This series of experiments was conducted to show the effect of catalyst component addition order on the high cis-1,4-polybutadiene rubber produced. These polymerizations were conducted employing essentially the same technique as was used in Examples 1-11 except for the fact that the polymerizations were conducted in only 200 ml of 1,3-butadiene in hexane solutions. The molar ratio of triisobutyl aluminum to nickel octanoate to hydrofluoric acid to para-styrenated diphenylamine was 40/1/80/40. The catalyst components were added approximately 2 minutes apart in the order shown in Table II. The polymer yield for the cis-1,4-polybutadiene produced is also shown in Table II. The Brookfield viscosity (BF), dilute solution viscosity (DSV), and cold flow of the high cis-1,4-polybutadiene rubber synthesized in this series of experiments are also included in Table II.

TABLE II

| Ex No | Addition Order | Yield | BF (cps) | DSV | Cold Flow (mg/min) |
|---|---|---|---|---|---|
| 12 | Al—Ni—HF | 99% | 18,700 | 3.00 | N/D |
| 13 | Al—W29—Ni—HF | 97% | 2,600 | 2.10 | N/D |
| 14 | Al—Ni—W29—HF | 97% | 2,000 | 1.98 | 1.93 |
| 15 | Al—Ni—HF—W29 | 97% | 18,900 | 2.89 | N/D |
| 16 | W29—HF—Al—Ni | 96% | 1,700 | 2.13 | 2.03 |

In Table II above, Al represents triisobutylaluminum, Ni represents nickel octanoate, W29 represents Wingstay ® 29 para-styrenated diphenylamine, and HF represents hydrofluoric acid. Brookfield viscosities were run at 25° C. using 10 weight percent polymer samples in toluene. Dilute solution viscosities were determined at 30° C. as 0.25 weight percent samples in toluene.

As can be seen from Table II it is critical to add the para-styrenated diphenylamine before the hydrofluoric acid is added. In cases where the para-styrenated diphenylamine was added before the hydrofluoric acid large reductions in the Brookfield viscosities and dilute solution viscosities of the cis-1,4-polybutadiene rubbers synthesized were observed. However, in cases where the hydrofluoric acid was added before the para-styrenated diphenylamine no reduction in Brookfield viscosity was observed and only an insignificant reduction in dilute solution viscosity was attained. This series of experiments accordingly illustrates the importance of catalyst component addition order in reducing molecular weight. However, in all of the polymerizations conducted in this series of experiments good polymer yields of at least 96% were attained.

EXAMPLES 17-24

This series of experiments was conducted to show the effect of the ratio of hydrogen fluoride to alkylaluminum on the cis-1,4-polybutadiene produced. The polymerizations were carried out in 8-ounce (237 ml) polymerization bottles using 200 ml of a 15.5% 1,3-butadiene/hexane solution. For each run 0.40 mM of p-styrenated diphenylamine was added, followed by 0.40 mM of triisobutylaluminum, 0.01 mM of nickel octanoate, and finally various amounts of hydrogen fluoride. Polymerizations were run at a temperature of 65° C. for 90 minutes. Rosin acid (1.0 phm) was added to terminate the polymerization. The cis-1,4-polybutadiene produced was isolated by air oven drying. Table III shows polymerization results.

TABLE III

| Example | HF/Al Ratio* | Yield (%) | DSV (dl/g) |
|---|---|---|---|
| 17 | 1.25 | 42 | 3.43 |
| 18 | 1.50 | 100 | 2.58 |
| 19 | 1.62 | 98 | 2.32 |
| 20 | 1.75 | 97 | 2.15 |
| 21 | 1.87 | 98 | 2.16 |
| 22 | 2.00 | 100 | 2.59 |
| 23 | 2.25 | 96 | 2.97 |
| 24 | 2.50 | 89 | 3.25 |

*HF/Al Ratio is the molar ratio of hydrogen fluoride to triisobutylaluminum

Inspection of the results presented in Table III show the hydrogen fluoride to triisobutylaluminum ratio to be critical in determining the ultimate molecular weight of the cis-1,4-polybutadiene produced. At low ratios the polymer yield is low and the DSV is high. As the ratio increases the yield also increases and the DSV decreases. The lowest DSV is attained at a hydrogen fluoride to triisobutylaluminum molar ratio of about 1.8. As the ratio is increased still higher the DSV increases, and at a ratio of 2.5 the DSV is 3.25.

EXAMPLES 25-31

Hydrogen fluoride can be preformed with the p-styrenated diphenylamine. In this case the p-styrenated diphenylamine serves both as a catalyst modifier to make lower molecular weight polymer and as a complexing agent for the hydrogen fluoride. In a typical example of a make-up of this complex a 50/50 weight percent solution of p-styrenated diphenylamine was made up in toluene. Hydrogen fluoride was bubbled into the solution until a hydrogen fluoride/p-styrenated diphenylamine ratio of 2.0 was attained. The molar concentration of the hydrogen fluoride for this solution is 2.58. This material was subsequently used in polymerization examples 25-31.

This series of polymerizations were carried out in 8-ounce (237 ml) polymerization bottles using 200 ml 17.2% 1,3-butadiene/hexane solutions. In the procedure employed, 0.40 mM of triisobutylaluminum was added, followed by 0,010 mM of nickel octanoate, and finally various amounts of hydrogen fluoride/p-styrenated diphenylamine. The polymerizations were conducted at a temperature of 65° C. for 90 minutes. Shortstop solution was added to give 1.0 phm isopropanol. The level of hydrogen fluoride used, the level of p-styrenated diphenylamine employed, the molar ratio of hydrogen fluoride to triisobutylaluminum, the polymer yield attained, and the DSV realized are shown in Table IV.

TABLE IV

| Example | HF[1] | W29[2] | HF/Al | Yield | DSV |
|---|---|---|---|---|---|
| 25 | 0.22 ml | 0.57 mM | 1.4 | 67% | 2.43 dl/g |
| 26 | 0.25 ml | 0.64 mM | 1.6 | 80% | 2.18 dl/g |
| 27 | 0.28 ml | 0.72 mM | 1.8 | 89% | 1.83 dl/g |
| 28 | 0.31 ml | 0.80 mM | 2.0 | 94% | 1.84 dl/g |
| 29 | 0.34 ml | 0.88 mM | 2.2 | 94% | 2.07 dl/g |
| 30 | 0.37 ml | 0.95 mM | 2.4 | 93% | 2.72 dl/g |
| 31 | 0.40 ml | 1.03 mM | 2.6 | 91% | 3.14 dl/g |

[1] - 2.58M hydrogen fluoride solution.
[2] - W29 represents Wingstay ® 29 para-styrenated diphenylamine.

The Brookfield viscosity and cold flow of the polymers made in Examples 26-29 were determined. The Brookfield viscosity and cold flow of these polymers are reported in Table V. Inspection of the results listed in Table IV shows that the preformed hydrogen fluoride/p-styrenated diphenylamine is very effective in controlling polymer DSV (which is an indicator of polymer molecular weight). Also, again it appears that the maximum reduction in polymer DSV is attained at a hydrogen fluoride to triisobutylaluminum molar ratio of about 1.8.

TABLE V

| Example | Brookfield Viscosity | Cold Flow |
|---|---|---|
| 26 | 5,750 cps | 0.96 mg/min |
| 27 | 2,000 cps | 1.99 mg/min |
| 28 | 1,825 cps | 1.14 mg/min |
| 29 | 4,450 cps | 0.79 mg/min |

While certain representative embodiments and details have been shown for the purpose of illustrating the subject invention, it will be apparent to those skilled in this art that various changes and modifications can be made without departing from the scope of the present invention.

What is claimed is:

1. A process for producing cis-1,4-polybutadiene having a reduced molecular weight and improved processability which comprises polymerizing 1,3-butadiene in the presence of (a) an organonickel compound, (b) an organoaluminum compound, (c) a fluorine containing compound, and (d) para-styrenated diphenylamine; wherein the organoaluminum compound and the fluorine containing compound are brought together in the presence of the para-styrenated diphenylamine.

2. A process as specified in claim 1 wherein the organoaluminum compound is a trialkylaluminum compound, wherein the organonickel compound is a nickel salt of a carboxylic acid, and wherein the fluorine compound is hydrogen fluoride or a hydrogen fluoride complex.

3. A process as specified in claim 2 wherein from about 0.25 phm to about 1.5 phm of the para-styrenated diphenylamine is present.

4. A process as specified in claim 3 wherein said process in conducted at a temperature which is within the range of about −10° C. to about 120° C.

5. A process as specified in claim 4 wherein said process is conducted on a batch basis.

6. A process as specified in claim 4 wherein the molar ratio of the organoaluminum compound to the organonickel compound is within the range of from about 0.3:1 to about 300:1, wherein the molar ratio of the fluorine containing compound to the organonickel compound is within the range of about 0.5:1 to about 200:1, and wherein the molar ratio of the fluorine containing compound to the organoaluminum compound is within the range of about 0.4:1 to about 10:1.

7. A process as specified in claim 6 wherein said process in conducted at a temperature which is within the range of about 30° C. to about 110° C.

8. A process as specified in claim 7 wherein from about 0.5 phm to about 0.75 phm of the para-styrenated diphenylamine is present.

9. A process as specified in claim 8 wherein said 1,3-butadiene monomer is polymerized to high cis-1,4-polybutadiene by solution polymerization in a polymerization medium which includes an organic solvent.

10. A process as specified in claim 9 wherein the polymerization medium contains from about 5 to about 35 weight percent monomers.

11. A process as specified in claim 10 wherein the molar ratio of the organoaluminum compound to the organonickel compound is within the range of about 3:1 to about 100:1, and wherein the molar ratio of the fluorine containing compound to the organoaluminum compound is within the range of about 0.7:1 to about 7:1.

12. A process as specified in claim 11 wherein the polymerization medium contains from about 10 to about 30 weight percent monomers.

13. A process as specified in claim 12 wherein the molar ratio of the fluorine containing compound to the organoaluminum compound is within the range of 1.5:1 to 2:1.

14. A process as specified in claim 12 wherein said process is conducted at a temperature which is within the range of about 70° C. to about 95° C.

15. A process as specified in claim 12 wherein said process is carried out until a polymer yield in excess of 90% is attained.

16. A process as specified in claim 12 wherein the polymerization medium contains from about 20 to about 25 weight percent monomers.

17. A process as specified in claim 1 wherein the organoaluminum compound is selected from the group consisting of diethyl aluminum hydride, di-n-propyl aluminum hydride, di-n-butyl aluminum hydride, diisobutyl aluminum hydride, diphenyl aluminum hydride, di-p-tolyl aluminum hydride, dibenzyl aluminum hydride, phenyl ethyl aluminum hydride, phenyl-n-propyl aluminum hydride, p-tolyl ethyl aluminum hydride, p-tolyl n-propyl aluminum hydride, p-tolyl isopropyl aluminum hydride, benzyl ethyl aluminum hydride, benzyl n-propyl aluminum hydride, benzyl isopropyl aluminum hydride, diethylaluminum ethoxide, diisobutylaluminum ethoxide, dipropylaluminum methoxide, trimethyl aluminum, triethyl aluminum, tri-n-propyl aluminum, triisopropyl aluminum, tri-n-butyl aluminum, triisobutyl aluminum, tripentyl aluminum, trihexyl aluminum, tricyclohexyl aluminum, trioctyl aluminum, triphenyl aluminum, tri-p-tolyl aluminum, tribenzyl aluminum, ethyl diphenyl aluminum, ethyl di-p-tolyl aluminum, ethyl dibenzyl aluminum, diethyl phenyl aluminum, diethyl p-tolyl aluminum, and diethyl benzyl aluminum.

18. A process as specified in claim 1 wherein the organoaluminum compound is selected from the group consisting of triethyl aluminum, tri-n-propyl aluminum, triisobutyl aluminum, and trihexyl aluminum; and wherein the organonickel compound is selected from the group consisting of nickel naphthenate, nickel octanoate, and nickel neodecanoate.

19. A process as specified in claim 18 wherein the fluorine containing compound is a hydrogen fluoride complex.

20. A process as specified in claim 1 wherein the fluorine containing compound is complexed with the para-styrenated diphenylamine.

* * * * *